(12) United States Patent
Lee et al.

(10) Patent No.: US 11,191,096 B2
(45) Date of Patent: Nov. 30, 2021

(54) METHOD FOR CONFIGURING SPS RESOURCES IN WIRELESS COMMUNICATION SYSTEM AND A DEVICE THEREFOR

(71) Applicant: LG ELECTRONICS INC., Seoul (KR)

(72) Inventors: Sunyoung Lee, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 104 days.

(21) Appl. No.: 16/712,837

(22) Filed: Dec. 12, 2019

(65) Prior Publication Data

US 2020/0120697 A1    Apr. 16, 2020

Related U.S. Application Data

(63) Continuation of application No. 15/742,012, filed as application No. PCT/KR2016/007800 on Jul. 18, 2016, now Pat. No. 10,548,161.
(Continued)

(51) Int. Cl.
*H04W 72/12*    (2009.01)
*H04W 28/02*    (2009.01)
(Continued)

(52) U.S. Cl.
CPC ......... *H04W 72/1268* (2013.01); *H04L 41/08* (2013.01); *H04W 16/24* (2013.01);
(Continued)

(58) Field of Classification Search
CPC ............ H04W 72/1268; H04W 72/04; H04W 72/042; H04W 72/0453; H04W 72/1289;
(Continued)

(56) References Cited

U.S. PATENT DOCUMENTS 9,455,813 B2    9/2016  Kim et al.
2007/0061844 A1  3/2007  Hakusui et al.
(Continued)

FOREIGN PATENT DOCUMENTS

WO    2011053534    5/2011
WO    2012055114    5/2012
(Continued)

OTHER PUBLICATIONS

U.S. Appl. No. 15/742,012, Office Action dated Dec. 14, 2018, 19 pages.
(Continued)

*Primary Examiner* — Jenee Holland
(74) *Attorney, Agent, or Firm* — Lee, Hong, Degerman, Kang & Waimey

(57) ABSTRACT

The present invention relates to a wireless communication system. More specifically, the present invention relates to a method and a device for configuring SPS resources in wireless communication system, the method comprising: configuring a plurality of cells; receiving information for semi-persistent scheduling (SPS) resource configuration with an indication indicating at least one cell among the plurality of cells on which the SPS resource configuration is to be configured; and configuring a set of SPS resources based on the SPS resource configuration on the at least one cell indicated by the indication.

2 Claims, 13 Drawing Sheets

Related U.S. Application Data

(60) Provisional application No. 62/194,779, filed on Jul. 20, 2015.

(51) Int. Cl.
  *H04L 12/24* (2006.01)
  *H04W 72/04* (2009.01)
  *H04W 16/24* (2009.01)
  *H04L 5/00* (2006.01)
  *H04W 88/02* (2009.01)

(52) U.S. Cl.
  CPC ....... *H04W 28/02* (2013.01); *H04W 28/0268* (2013.01); *H04W 72/04* (2013.01); *H04W 72/042* (2013.01); *H04W 72/0453* (2013.01); *H04W 72/1289* (2013.01); *H04L 5/001* (2013.01); *H04L 5/0044* (2013.01); *H04L 5/0094* (2013.01); *H04W 88/02* (2013.01)

(58) Field of Classification Search
  CPC . H04W 16/24; H04W 28/02; H04W 28/0268; H04L 41/08
  See application file for complete search history.

(56) References Cited

U.S. PATENT DOCUMENTS

| | | | |
|---|---|---|---|
| 2010/0229205 A1 | 9/2010 | Hakusui | |
| 2010/0273448 A1 | 10/2010 | Iwamura et al. | |
| 2010/0322175 A1* | 12/2010 | Chen | H04L 5/0094 370/329 |
| 2011/0134774 A1 | 6/2011 | Pelletier et al. | |
| 2012/0172044 A1 | 7/2012 | Wu | |
| 2012/0201232 A1 | 8/2012 | Velusamy et al. | |
| 2012/0250631 A1 | 10/2012 | Hakola et al. | |
| 2012/0270590 A1 | 10/2012 | Lu et al. | |
| 2013/0083702 A1 | 4/2013 | Barany et al. | |
| 2013/0223301 A1* | 8/2013 | Lee | H04W 72/042 370/281 |
| 2013/0229931 A1 | 9/2013 | Kim | |
| 2013/0242777 A1 | 9/2013 | Choi et al. | |
| 2013/0242923 A1 | 9/2013 | Yang et al. | |
| 2013/0294247 A1 | 11/2013 | Zhu et al. | |
| 2013/0301582 A1 | 11/2013 | Jiang et al. | |
| 2014/0056243 A1 | 2/2014 | Pelletier et al. | |
| 2014/0112218 A1 | 4/2014 | Li | |
| 2014/0192740 A1 | 7/2014 | Ekpenyong et al. | |
| 2014/0192757 A1 | 7/2014 | Lee et al. | |
| 2014/0241319 A1 | 8/2014 | Lee et al. | |
| 2014/0242989 A1 | 8/2014 | Cai et al. | |
| 2014/0286243 A1 | 9/2014 | Yamada | |
| 2014/0307623 A1 | 10/2014 | Gheorghiu et al. | |
| 2015/0092563 A1 | 4/2015 | Tabet et al. | |
| 2015/0124743 A1* | 5/2015 | Damnjanovic | H04W 76/15 370/329 |
| 2015/0181593 A1 | 6/2015 | Kim et al. | |
| 2015/0256303 A1 | 9/2015 | Belghoul et al. | |
| 2015/0271836 A1 | 9/2015 | Damnjanovic et al. | |
| 2015/0327236 A1 | 11/2015 | Lin | |
| 2015/0373767 A1 | 12/2015 | Park et al. | |
| 2016/0073428 A1 | 3/2016 | Vutukuri et al. | |
| 2016/0173236 A1 | 6/2016 | Cheng et al. | |
| 2016/0226632 A1 | 8/2016 | Zhang et al. | |
| 2016/0227561 A1 | 8/2016 | Susitaival et al. | |
| 2016/0269945 A1 | 9/2016 | Jang et al. | |
| 2017/0353912 A1 | 12/2017 | Einhaus et al. | |
| 2017/0367003 A1 | 12/2017 | Zhang et al. | |
| 2018/0205599 A1 | 7/2018 | Lee et al. | |

FOREIGN PATENT DOCUMENTS

| | | |
|---|---|---|
| WO | 2014119858 | 8/2014 |
| WO | 2014154277 | 10/2014 |

OTHER PUBLICATIONS

U.S. Appl. No. 15/742,012, Notice of Allowance dated Nov. 5, 2019, 15 pages.
PCT International Application No. PCT/KR2016/005982, Notification of Transmittal of the International Search Report and the Written Opinion of the International Searching Authority, or Declaration dated Sep. 27, 2016, 11 pages.
PCT International Application No. PCT/KR2016/006029, Notification of Transmittal of the International Search Report and the Written Opinion of the International Searching Authority, or Declaration dated Sep. 27, 2016, 11 pages.
PCT International Application No. PCT/KR2016/007800, Notification of Transmittal of the International Search Report and the Written Opinion of the International Searching Authority, or Declaration dated Sep. 12, 2016, 15 pages.
Huawei, et al., "Support for carrier selection/switching in CA enhancement", 3GPP TSG RAN WG1 Meeting #81, R1-153205, May 2015, 7 pages.
Samsung, "Support for CIF of 3 bits in CA enhancements", 3GPP TSG RAN WG2 Meeting #90, R2-152718, May 2015, 2 pages.
Ericsson, "Analysis of SON for AAS cell splitting scenarios", 3GPP TSG RAN WG3 Meeting #83, R3-140319, Feb. 2014, 5 pages.
U.S. Appl. No. 15/746,385, Office Action dated Feb. 27, 2019, 24 pages.
U.S. Appl. No. 15/746,385, Office Action dated Feb. 10, 2020, 17 pages.
U.S. Appl. No. 15/746,385, Office Action dated Jun. 11, 2019, 18 pages.
U.S. Appl. No. 15/742,825, Office Action dated Nov. 29, 2018, 8 pages.

\* cited by examiner

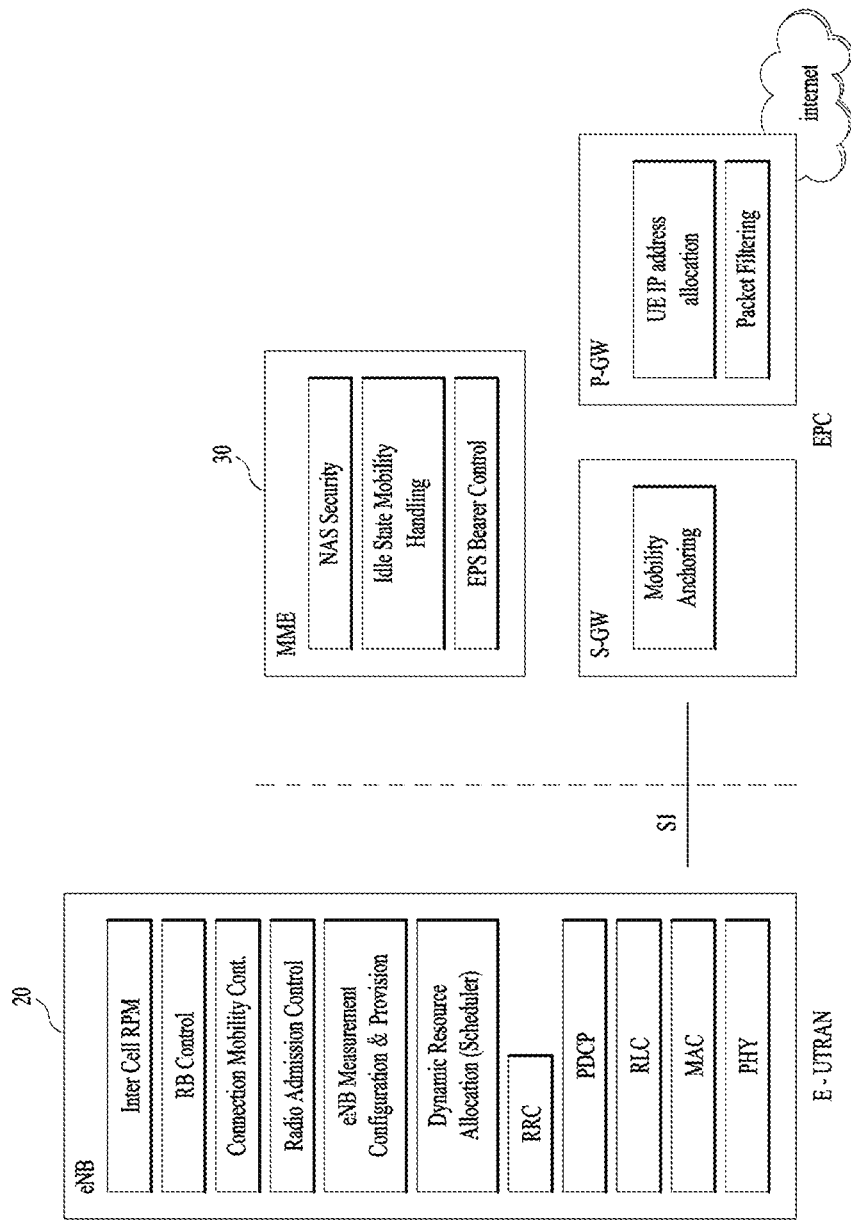

(a) Control-Plane Protocol Stack (b) User-Plane Protocol Stack

METHOD FOR CONFIGURING SPS RESOURCES IN WIRELESS COMMUNICATION SYSTEM AND A DEVICE THEREFOR

CROSS-REFERENCE TO RELATED APPLICATIONS

This application is a continuation of U.S. patent application Ser. No. 15/742,012, filed on Jan. 4, 2018, currently pending, which is the National Stage filing under 35 U.S.C. 371 of International Application No. PCT/KR2016/007800, filed on Jul. 18, 2016, which claims the benefit of U.S. Provisional Application No. 62/194,779, filed on Jul. 20, 2015, the contents of which are all hereby incorporated by reference herein in their entirety.

TECHNICAL FIELD

The present invention relates to a wireless communication system and, more particularly, to a method for configuring SPS resources in wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for receiving a signal in wireless communication system.

The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

According to the present invention, the invention is that the UE transmits the specific type of data on a cell which is mapped to that type of data. For this, the UE receives an indication which indicates the mapping between the type of data and the cell. For the type of data, if the UE does not receive the indication, the UE transmits that type of data on any cell.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 2B is a block diagram depicting architecture of a typical E-UTRAN and a typical EPC;

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
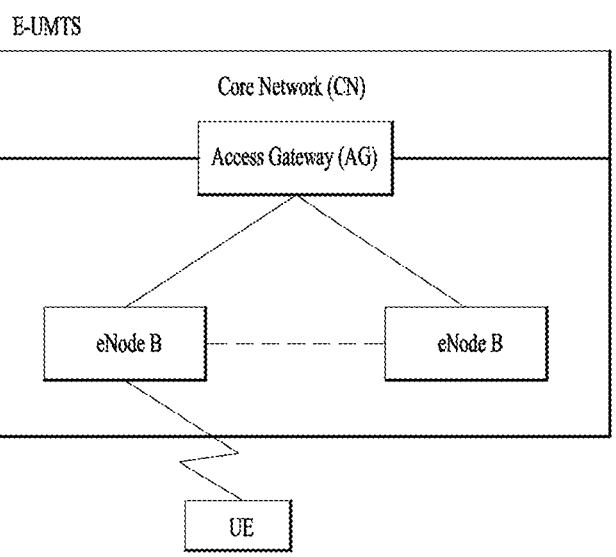
FIG. 1 is a diagram showing a network structure of an Evolved Universal Mobile Telecommunications System (E-UMTS) as an example of a wireless communication system.
Figure 2A:
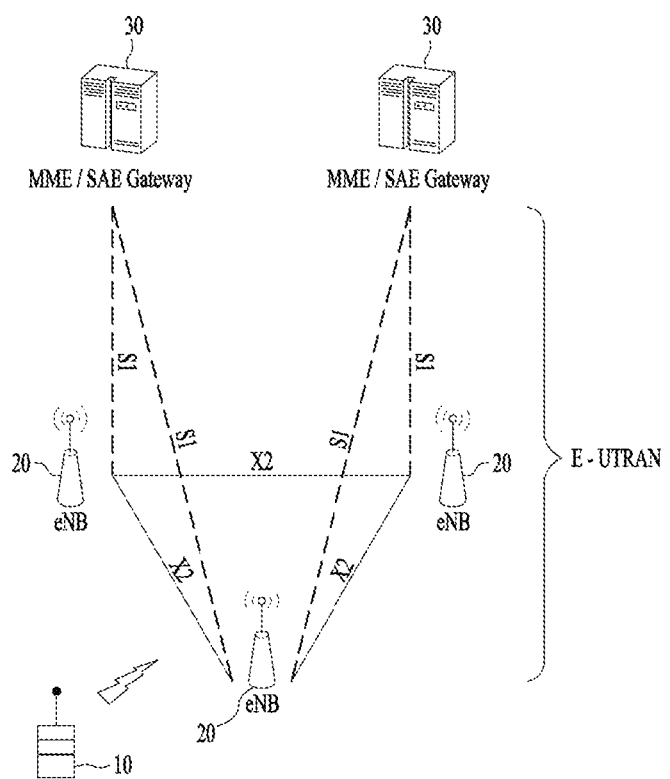
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
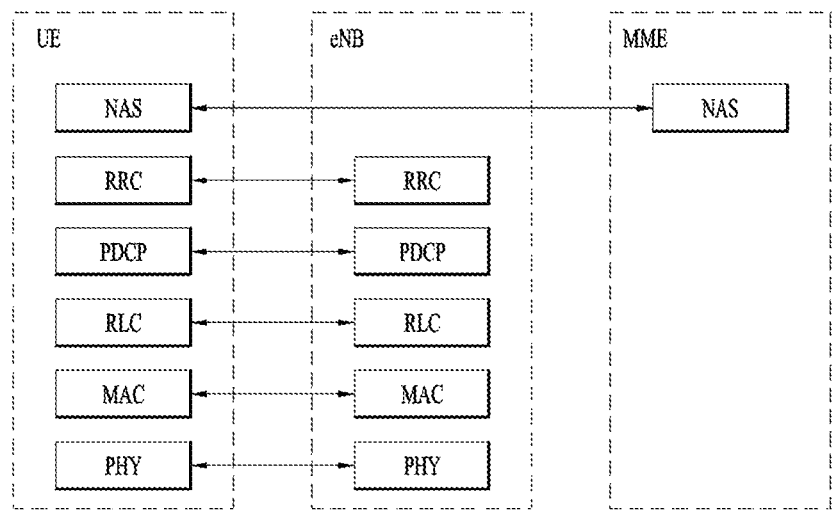
FIG. 3 is a diagram showing a control plane and a user plane of a radio interface protocol between a UE and an E-UTRAN based on a 3rd generation partnership project (3GPP) radio access network standard.
Figure 3:
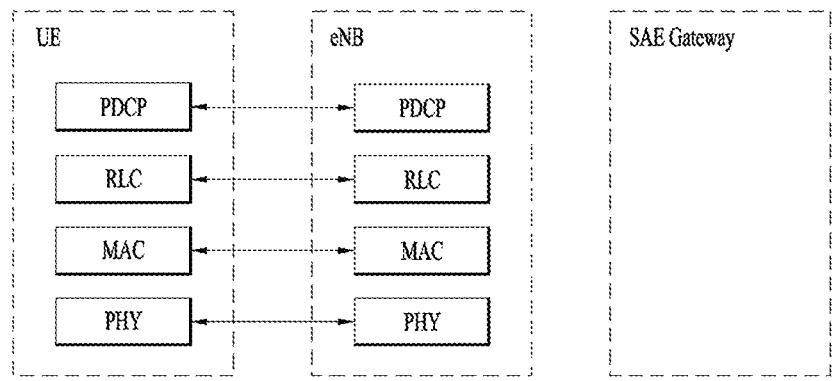

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
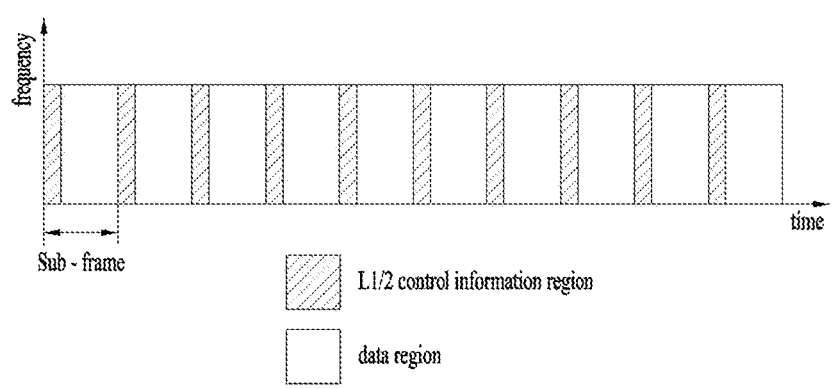
FIG. 4 is a view showing an example of a physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
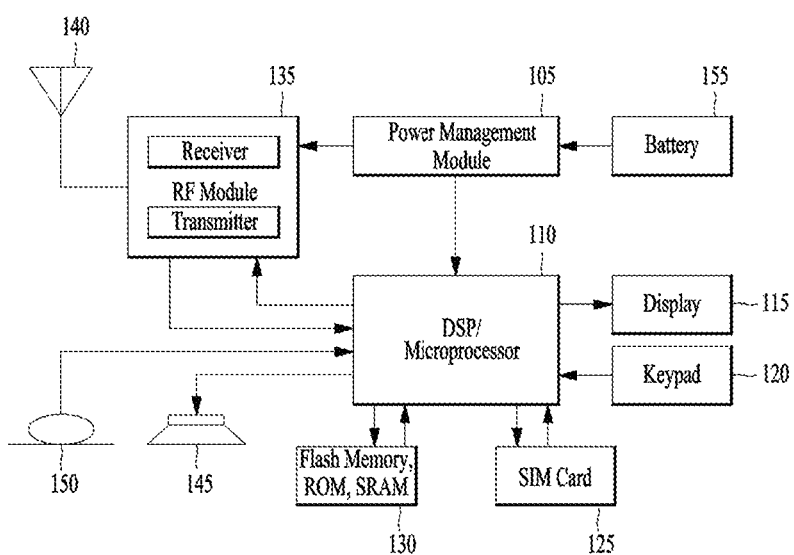
FIG. 5 is a block diagram of a communication apparatus according to an embodiment of the present invention.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transmiceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Figure 6:
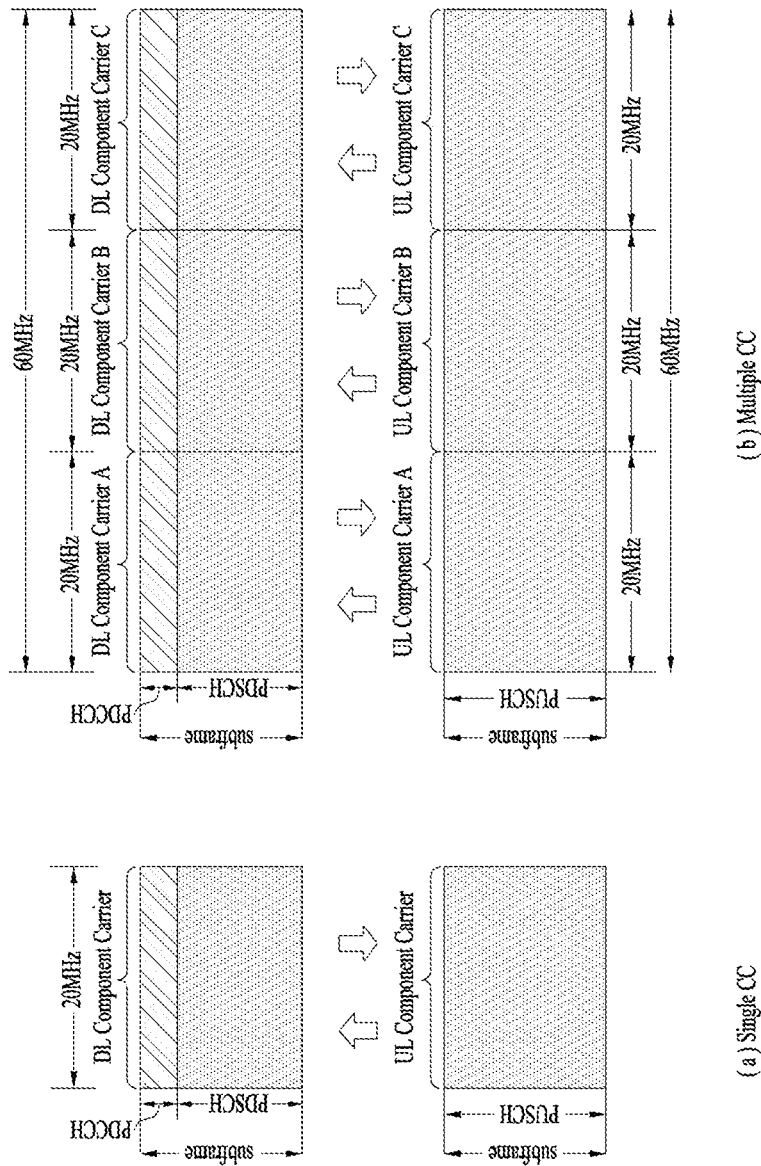
FIG. 6 illustrates an example of CCs and carrier aggregation in the LTE-A system, which are used in embodiments of the present disclosure.

FIG. 6 illustrates an example of CCs and CA in the LTE-A system, which are used in embodiments of the present disclosure.

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present disclosure.

FIG. 6(a) illustrates a single carrier structure in the LTE system. There are a DL CC and a UL CC and one CC may have a frequency range of 20 MHz.

FIG. 6(b) illustrates a CA structure in the LTE-A system. In the illustrated case of FIG. 6(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher-layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

Figure 7A:
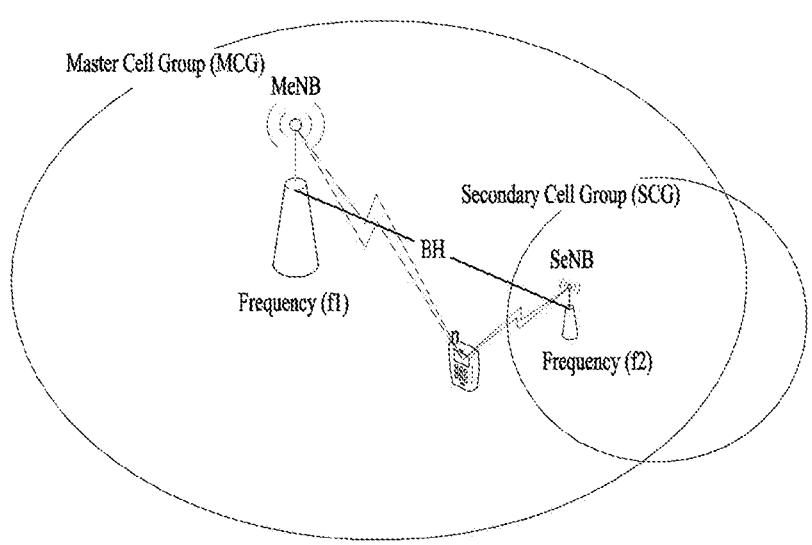
FIG. 7A is a diagram for MAC structure overview in a UE side.
Figure 7B:
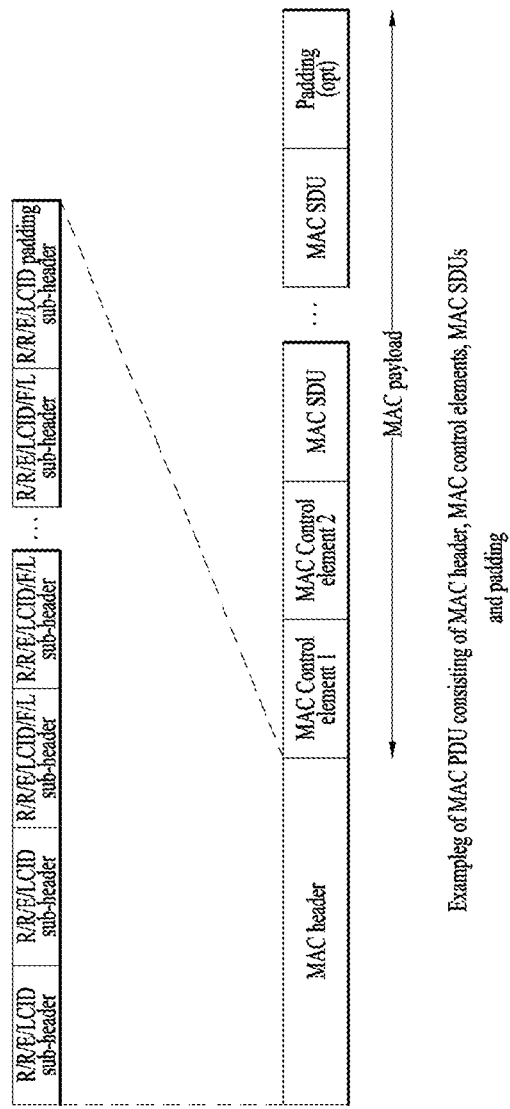
FIG. 7B is a diagram for MAC PDU consisting of MAC header, MAC control elements, MAC SDUs and padding.

FIG. 7A is a diagram for MAC structure overview in a UE side, and FIG. 7B is a diagram for MAC PDU consisting of MAC header, MAC control elements, MAC SDUs and padding.

The MAC layer handles logical-channel multiplexing, hybrid-ARQ retransmissions, and uplink and downlink scheduling. It is also responsible for multiplexing/demultiplexing data across multiple component carriers when carrier aggregation is used.

The MAC provides services to the RLC in the form of logical channels. A logical channel is defined by the type of information it carries and is generally classified as a control channel, used for transmission of control and configuration information necessary for operating an LTE system, or as a traffic channel, used for the user data.

From the physical layer, the MAC layer uses services in the form of transport channels. A transport channel is defined by how and with what characteristics the information is transmitted over the radio interface. Data on a transport channel is organized into transport blocks. In each Transmission Time Interval (TTI), at most one transport block of dynamic size is transmitted over the radio interface to/from a terminal in the absence of spatial multiplexing. In the case of spatial multiplexing (MIMO), there can be up to two transport blocks per TTI.

Associated with each transport block is a Transport Format (TF), specifying how the transport block is to be transmitted over the radio interface. The transport format includes information about the transport-block size, the modulation-and-coding scheme, and the antenna mapping. By varying the transport format, the MAC layer can thus realize different data rates. Rate control is therefore also known as transport-format selection.

To support priority handling, multiple logical channels, where each logical channel has its own RLC entity, can be multiplexed into one transport channel by the MAC layer. At the receiver, the MAC layer handles the corresponding demultiplexing and forwards the RLC PDUs to their respective RLC entity for in-sequence delivery and the other functions handled by the RLC. To support the demultiplexing at the receiver, a MAC header, shown in FIG. 7B, is used.

To each RLC PDU, there is an associated sub-header in the MAC header. The sub-header contains the identity of the logical channel (LCID) from which the RLC PDU originated and the length of the PDU in bytes. There is also a flag indicating whether this is the last sub-header or not. One or several RLC PDUs, together with the MAC header and, if necessary, padding to meet the scheduled transport-block size, form one transport block which is forwarded to the physical layer.

In addition to multiplexing of different logical channels, the MAC layer can also insert the so-called MAC control elements into the transport blocks to be transmitted over the transport channels. A MAC control element is used for inband control signaling—for example, timing-advance commands and random-access response. Control elements are identified with reserved values in the LCID field, where the LCID value indicates the type of control information. Furthermore, the length field in the sub-header is removed for control elements with a fixed length.

A MAC PDU header consists of one or more MAC PDU subheaders; each subheader corresponds to either a MAC SDU, a MAC control element or padding.

A MAC PDU subheader consists of the six header fields R/R/E/LCID/F/L but for the last subheader in the MAC PDU and for fixed sized MAC control elements. The last subheader in the MAC PDU and subheaders for fixed sized MAC control elements consist solely of the four header fields R/R/E/LCID. A MAC PDU subheader corresponding to padding consists of the four header fields R/R/E/LCID.

MAC PDU subheaders have the same order as the corresponding MAC SDUs, MAC control elements and padding. MAC control elements are always placed before any MAC SDU.

Padding occurs at the end of the MAC PDU, except when single-byte or two-byte padding is required. Padding may have any value and the UE shall ignore it. When padding is performed at the end of the MAC PDU, zero or more padding bytes are allowed.

When single-byte or two-byte padding is required, one or two MAC PDU subheaders corresponding to padding are placed at the beginning of the MAC PDU before any other MAC PDU subheader. A maximum of one MAC PDU can be transmitted per TB per UE. A maximum of one MCH MAC PDU can be transmitted per TTI.

Figure 8:
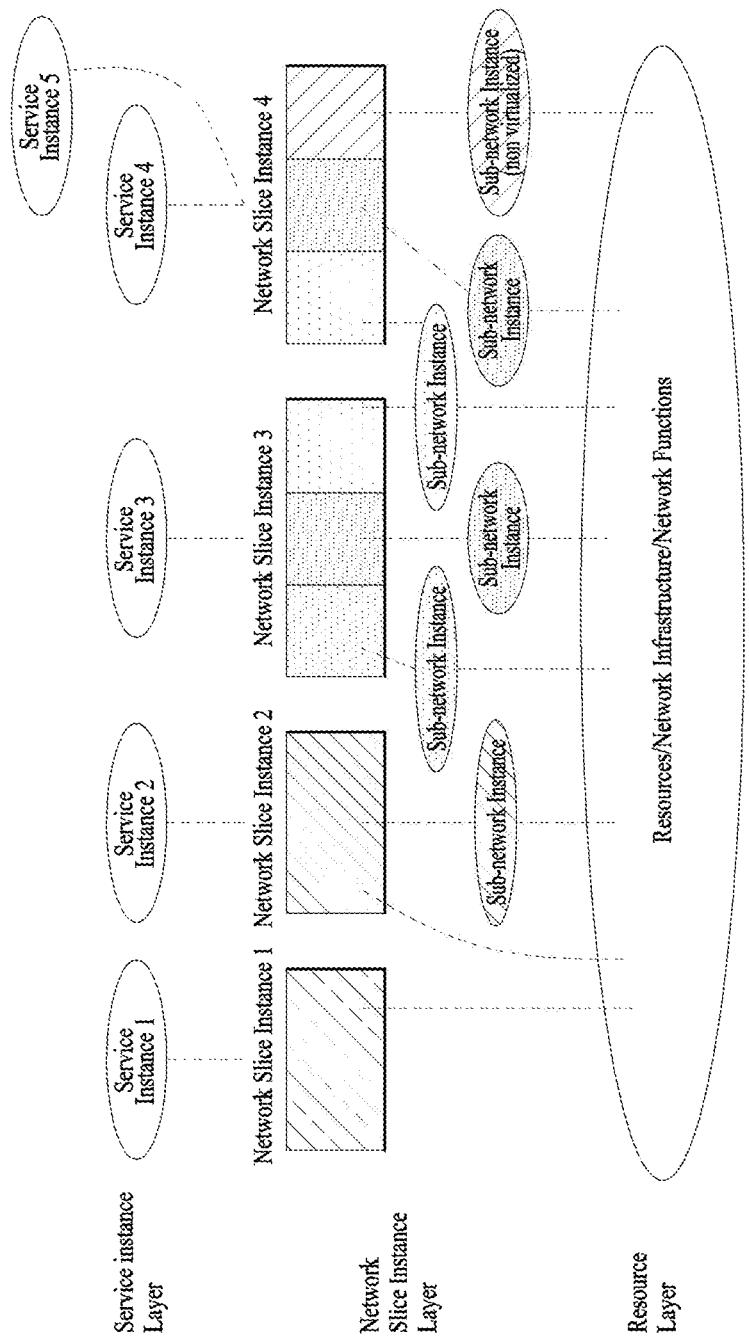
FIG. 8 is a diagram for exemplary of Network slicing conceptual outline.

FIG. 8 is a diagram for exemplary Network slicing conceptual outline.

The 5G use cases demand very diverse and sometimes extreme requirements. The current architecture utilizes a relatively monolithic network and transport framework to accommodate a variety of services such as mobile traffic from smart phones, OTT content, feature phones, data cards, and embedded M2M devices. It is anticipated that the current architecture is not flexible and scalable enough to efficiently support a wider range of business need when each has its own specific set of performance, scalability and availability requirements. Furthermore, introduction of new network services should be made more efficient. Nevertheless, several use cases are anticipated to be active concurrently in the same operator network, thus requiring a high degree of flexibility and scalability of the 5G network.

Recently, as discussion on 5G is vitalizing, such a concept as network slicing is frequently mentioned. Both communication service providers and venders are proposing the network slicing with a network structure of 5G.

The network slicing is to provide a service-specific dedicated network to various services having properties different from each other in a manner of constructing such a logically separated network as end-to-end by physically including Device, Access, Transport and Core via a single network.

It is guaranteed to have a resource (a virtualized resource in a server, a virtualized network resource) to each network slice. Since each slice is insulated, although an error or disorder occurs in a specific slice, it does not affect communication of other slice.

A UE processed by a mobile network corresponds to a phone and a network structure optimized for the phone only has been required until 4G, whereas a network structure optimized for various terminals of a different attribute is required in 5G. As a representative Use-Case of 5G, Mobile Broadband, Massive IoT, Mission-critical IoT and the like have different attributes and network requirements in terms of Mobility, Charging, Security, Police Control, Latency, Reliability and the like. For example, in case of Massive IoT service that fixed sensors for measuring temperature, humidity, precipitation, and the like are connected with a mobile network, unlike a phone, it is not necessary for the service to have such a function as Hanover or Locate update. And, in case of Mission-critical IoT service such as autonomous driving or remote controlling of industrial robot, unlike a mobile broadband service, the service requires low latency lower than several ms.

As depicted in FIG. 8, the network slicing concept consists of 3 layers: 1) Service Instance Layer, 2) Network Slice Instance Layer, and 3) Resource layer.

Service Instance is an instance of an end-user service or a business service that is realized within or by a Network Slice. The Service Instance Layer represents the services which are to be supported. Each service is represented by a Service Instance. Typically services can be provided by the network operator or by $3^{rd}$ parties. In line with this, a Service Instance can either represent an operator service or a $3^{rd}$ party provided service.

A network operator uses a Network Slice Blueprint to create a Network Slice Instance. Network Slice Instance is a set of network functions, and resources to run these network functions, forming a complete instantiated logical network to meet certain network characteristics required by the Service Instance(s). A network slice instance may be fully or partly, logically and/or physically, isolated from another network slice instance. The resources comprises of physical and logical resources. A Network Slice Instance may be composed of Sub-network Instances, which as a special case may be shared by multiple network slice instances. The Network Slice Instance is defined by a Network Slice Blueprint. Instance-specific policies and configurations are required when creating a Network Slice Instance. Network characteristics examples are ultra-low-latency, ultra-reliability etc.

Network Slice Blueprint is a complete description of the structure, configuration and the plans/work flows for how to instantiate and control the Network Slice Instance during its life cycle. A Network Slice Blueprint enables the instantiation of a Network Slice, which provides certain network characteristics (e.g. ultra-low latency, ultra-reliability, value-added services for enterprises, etc.). A Network Slice Blueprint refers to required physical and logical resources and/or to Sub-network Blueprint(s).

A Network Slice Instance provides the network characteristics which are required by a Service Instance. A Network Slice Instance may also be shared across multiple Service Instances provided by the network operator. The Network Slice Instance may be composed by none, one or more Sub-network Instances, which may be shared by another Network Slice Instance. Similarly, the Sub-network Blueprint is used to create a Sub-network Instance to form a set of Network Functions, which run on the physical/logical resources.

Figure 9:
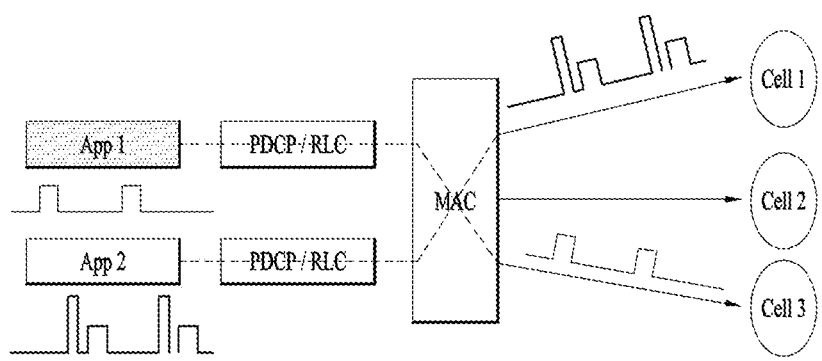
FIG. 9 is conceptual diagrams for diverse data applications for carrier aggregation.

FIG. 9 is conceptual diagrams for diverse data applications for carrier aggregation.

The range of device types utilising current mobile networks continues to expand, encompassing smartphones, laptops, netbooks, tablets and embedded modems. Many are capable of running a wide variety of data applications, often in parallel. Such a diversity in device and application type creates a corresponding diversity in the traffic profiles that must be efficiently supported by the radio access networks on which they run.

Numerous applications require that an always-on mobile-broadband experience is seamlessly delivered and presented to the end user. Furthermore, many applications may be designed without specific consideration of the characteristics of cellular networks, and consequently may exhibit traffic profiles not well suited to those connections. When attempting to provide such always-on connectivity at the RAN level, trade-offs are often encountered between UE power consumption, user experience, data transfer latency, network efficiency and control plane signalling overhead. Furthermore, the optimum trade-off point may vary according to application characteristics, or their activity or status. Some specific issues were identified and discussed in RAN WG2 as part of TEI-10; creation of a work item would enable a more complete treatment of this topic.

Current trends indicate that the above issues will only increase in significance over the coming years. It is imperative therefore that the ability of LTE to efficiently handle and manage such traffic is continually improved.

A study item in TSG SA "non-MTC Mobile Data Applications Impacts" is ongoing and is investigating service scenarios and service enhancements for data applications. The work item "LTE RAN Enhancements for Diverse Data Applications" addresses RAN-level improvements within the existing RAN architecture.

In a carrier aggregation system comprising a plurality of cells according to the currently specification, there is no differentiation between different cells. That is, all cells aggregated to a UE are assumed to have same or similar characteristics. UL grants from different cells are served equally, i.e. there is no differentiation between UL grants from different cells. With diverse data applications, it may be required to map certain bearers or certain data to a specific cell, e.g. with better channel quality, or with better cell load situation.

In CA, the MAC functions are not optimized for diverse data applications. According to current MAC function, the SPS is not supported with CA, only single DRX pattern is supported, and Single value of sCellDeactivationTimer is used for all cells. For the optimized MAC operation with diverse data applications, it may be required to support cell-level MAC operation.

FIG. 9 discloses that different applications are transmitted to a respective cell mapped to a respective application. A radio bearer comprises a PDCP entity, a RLC entity and a MAC entity, and the MAC entity can be associated with a plurality of RLCs. That the MAC entity can be associated with a plurality of RLCs means that the MAC entity can be associated with a plurality of radio bearers. Considering a MAC function according to the current specification, the MAC entity doesn't need to distinguish different data from the different radio bearers.

For the Diverse Data Application, there is an event that the UE should transmit a specific data to a specific cell depending to type of data or type of bearers. However, considering a MAC function according to the current specification, because the MAC entity cannot tell the different applications, the UE needs a method for distinguishing different data from the different radio bearers when the UE generates a MAC PDU to be transmitted on the specific cell, which includes data to be transmitted to the specific cell.

In particular, in case of a 5G system to which network slicing is applied, in order to provide a service-specific dedicated network to various services of a different property, it is able to propose a method of mapping a type of data providing a specific service to a network (or a cell) providing the service.

Thus, in case that there is a mapping relation between types of data and cells configured to the UE, the MAC entity needs to distinguish between a specific data to be transmitted on a specific cell and the specific data not to be transmitted on the specific cell when the MAC entity generates a MAC PDU.

Figure 10:
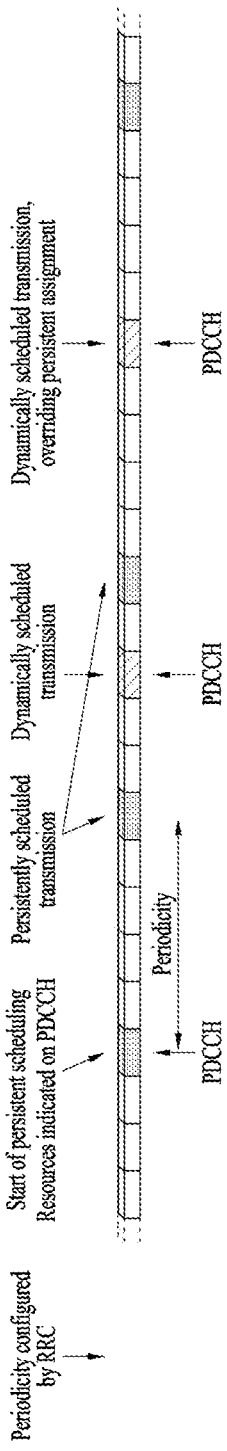
FIG. 10 is a diagram for exemplary of semi-persistent scheduling.

FIG. 10 is a diagram for exemplary of semi-persistent scheduling.

The purpose of the scheduler is to determine to/from which terminal(s) to transmit data and on which set of resource blocks. The scheduler is a key element and to a large degree determines the over-all behavior of the system. The basic operation is so-called dynamic scheduling, where the eNodeB in each 1 ms TTI transmits scheduling information to the selected set of terminals, controlling the uplink and downlink transmission activity. The scheduling decisions are transmitted on the PDCCHs. To reduce the control signaling overhead, there is also the possibility of semi-persistent scheduling.

For carrier aggregation, each component carrier is independently scheduled with individual scheduling assignments/grants and one DL-SCH/UL-SCH per scheduled component carrier. Semi-persistent scheduling is only supported on the primary component carriers, motivated by the fact that the main usage is for small payloads not requiring multiple component carriers.

The downlink scheduler is responsible for dynamically controlling the terminal(s) to transmit to and, for each of these terminals, the set of resource blocks upon which the terminal's DL-SCH (or DL-SCHs in the case of carrier aggregation) is transmitted).

The uplink scheduler dynamically controls which terminals are to transmit on their UL-SCH (or UL-SCHs in the case of carrier aggregation) and on which uplink resources.

The basis for uplink and downlinks scheduling is dynamic scheduling with a new scheduling decision taken in each subframe allows for full flexibility in terms of the resources used and can handle large variations in the amount of data to transmit at the cost of the scheduling decision being sent on a PDCCH in each subframe. In many situations, the overhead in terms of control signaling on the PDCCH is well motivated and relatively small compared to the payload on DL-SCH/UL-SCH. However, some services, most notably voice-over IP, are characterized by regularly occurring transmission of relatively small payloads. To reduce the control signaling overhead for those services, LTE provides semi-persistent scheduling in addition to dynamic scheduling.

With semi-persistent scheduling, the terminal is provided with the scheduling decision on the PDCCH, together with an indication that this applies to every nth subframe until further notice. Hence, control signaling is only used once and the overhead is reduced, as illustrated in FIG. 10. The periodicity of semi-persistently scheduled transmissions (that is, the value of n) configured by RRC signaling in advance, while activation and deactivation are done using the PDCCH using the semi-persistent C-RNTI. For example, for voice-over IP the scheduler can configure a periodicity of 20 ms for semi-persistent scheduling and, once a talk spurt starts, the semi-persistent pattern is triggered by the PDCCH.

After enabling semi-persistent scheduling, the terminal continues to monitor the PDCCH for uplink and downlink scheduling commands. When a dynamic scheduling command is detected, it takes precedence over the semi-persistent scheduling in that particular subframe, which is useful if the semi-persistently allocated resources occasionally need to be increased. For example, for voice-over IP in parallel with web browsing it may be useful to override the semi-persistent resource allocation with a larger transport block when downloading the web page.

For the downlink, only initial transmissions use semi-persistent scheduling. Retransmissions are explicitly scheduled using a PDCCH assignment. This follows directly from the use of an asynchronous hybrid-ARQ protocol in the downlink. Uplink retransmissions, in contrast, can either follow the semi-persistently allocated subframes or be dynamically scheduled.

Semi-persistent scheduling is only supported on the primary component carrier and any transmission on a secondary component carrier must be dynamically scheduled. This is reasonable as semi-persistent scheduling is intended for low-rate services for which a single component carrier is sufficient.

According to a current standard document, the eNB provides an SPS resource configuration via RRC signaling to the UE, and the UE configures SPS resources based on the SPS resource configuration on the primary component carrier, even though the UE configures multiple component carriers.

Meanwhile, in case of a 5G system to which network slicing is applied, in order to provide a service-specific dedicated network to various services of a different property, the primary component carrier and the secondary component carrier can serve different types of data, independently. In this case, semi-persistent scheduling had better be applied to not only the primary component carrier but also the secondary component carrier, because the secondary component carrier doesn't depend on the primary component carrier anymore.

Therefore, there should be a solution for the eNB to provide to the UE multiple SPS resource configurations so that the UE can configures each of the multiple SPS resource configurations on at least one cell in carrier aggregation system.

Figure 11:
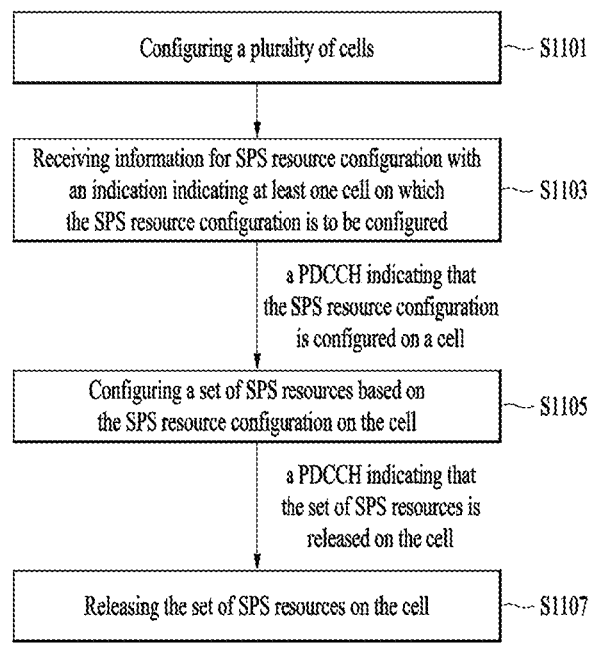
FIG. 11 is a conceptual diagram for configuring SPS resources for diverse data applications for carrier aggregation according to embodiments of the present invention.

FIG. 11 is a conceptual diagram for configuring SPS resources for diverse data applications for carrier aggregation according to embodiments of the present invention.

This invention is that the UE configures SPS resources on multiple cells based on an indication indicating a mapping between a SPS resource configuration and a cell.

When the UE configures a plurality of cells (S1101), the UE can receive an indication which indicates a mapping between a SPS resource configuration and a cell (S1103).

Preferably, the indication indicating at least one cell among the plurality of cells on which the SPS resource configuration is to be configured.

Preferably, the indication is transmitted with information for SPS resource configuration which the UE has to configure on the at least one cell.

Preferably, the indication is transmitted via RRC, PDCP, RLC, or MAC signal.

Preferably, the SPS resource configuration includes SPS related timers, or SPS interval.

Preferably, the indication can include multiple SPS resources and multiple cell identities, wherein one SPS resource is mapped to at least one cell and one cell is configured with one SPS resource. For example, UE receives the indication which indicates, SPS resource 1 is to be configured with cell 1 and cell 2, and SPS resource 2 is to be configured with cell 3.

Preferably, the indication includes at least one identifier corresponding to the least one cell.

Additionally, the SPS resource configuration can be transmitted via SPS patterns. The SPS pattern has own SPS resource size, and own SPS interval.

The UE is configured with multiple SPS patterns on a cell. For this, the UE receives an indication which include multiple SPS patterns and an identity of a cell with which the multiple SPS patterns are to be configured.

Preferably, the multiple SPS patterns have different SPS resource size and SPS interval, and the indication includes multiple SPS patterns for multiple cells. For example, the UE receives the indication including, SPS pattern 1 for Cell 1, SPS pattern 2 for Cell 1, SPS pattern 1 for Cell 2, and SPS pattern 3 for Cell 2.

When the UE receives the indication, the UE considers that the SPS resource configuration is configured on the least one cell indicated by the indication.

And then, when the UE receives a PDCCH addressed by the SPS C-RNTI indicating that the SPS resource configuration is configured on a cell among the one or more indicated cells, the UE initiates or re-initiates the SPS resources by configuring a set of SPS resources based on the SPS resource configuration on the cell (S1105). When the UE receives a PDCCH addressed by the SPS C-RNTI indicating that the set of SPS resources is released on the cell among the one or more indicated cells, the UE can release the set of SPS resources on the cell (S1107).

Preferably, the UE performs initialization, re-initialization, and release of SPS resource independently across cells. And the UE performs initialization, re-initialization, release of SPS resources independently per SPS pattern and per cell.

The UE receives an indication which indicates a SPS pattern to be initialized, re-initialized, or released by L2 or L1 signalling, or the UE receives an indication which indicates a cell of which the indicated SPS pattern to be initialized, re-initialized, or released by L2 or L1 signalling.

If the UE does not receive the indication which indicates the cell of which the indicated SPS pattern to be initialized, re-initialized, or released, the UE performs initialization, re-initialization, release of the indicated SPS resource for the cell on which the UE receives PDCCH addressed by SPS C-RNTI.

In addition, the UE can receive an indication which indicates mapping between SPS pattern and specific type of data, which includes SPS pattern identification and a type of data, wherein a type of data is mapped to at least one cell among the plurality of cells.

When the UE receives the indication indicating mapping between the SPS resource configurations and the type of data, the UE transmits a data only on at least one cell which is mapped to a first type of data by using a SPS resource mapped to the first type of data in the SPS resource configurations, if the data belongs to the first type of data. If a data doesn't belong to the first type of data and belongs to a second type of data, the data is only transmitted on a least one cell which is mapped to the second type of data by using a SPS resource mapped to the second type of data. For example, the UE can be configured as SPS pattern 1 is configured on Cell 1 and SPS pattern 1 is mapped to VoIP, and SPS pattern 2 is configured on Cell 1 and SPS pattern 2 is mapped to RLC UM data.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

What is claimed is:

1. A method performed by a user equipment (UE) for operating in a wireless communication system, the method comprising:

configuring a plurality of cells;

receiving first information for a mapping relation between types of bearers and semi-persistent scheduling (SPS) resource configurations, and second information for a mapping relation between the SPS resource configurations and the plurality of cells; and transmitting a data belonging to a first type bearer on a first cell among the plurality of cells based on a first SPS resource configuration, wherein the first type of bearer is mapped to the first SPS resource configuration based on the first information, and wherein the first SPS resource configuration is mapped to the first cell based on the second information, wherein based on a data belonging to a second type bearer being different from the data belonging to the first type bearer, the data belonging to the second type of bearer is transmitted on a second cell among the plurality of cells based on a second SPS resource configuration, wherein the second type bearer is mapped to the second SPS resource configuration based on the first information, and wherein the second SPS resource configuration is mapped to the second cell based on the second information.

2. A User Equipment (UE) for operating in a wireless communication system, the UE comprising:

a Radio Frequency (RF) module; and a processor operably coupled with the RF module and configured to:

configure a plurality of cells, receive first information for a mapping relation between types of bearers and semi-persistent scheduling (SPS) resource configurations, and second information for a mapping relation between the SPS resource configurations and the plurality of cells; and transmit a data belonging to a first type bearer on a first cell among the plurality of cells based on a first SPS resource configuration, wherein the first type of bearer is mapped to the first SPS resource configuration based on the first information, and wherein the first SPS resource configuration is mapped to the first cell based on the second information, wherein based on a data belonging to a second type bearer being different from the data belonging to the first type bearer, the data belonging to the second type of bearer is transmitted on a second cell among the plurality of cells based on a second SPS resource configuration, wherein the second type bearer is mapped to the second SPS resource configuration based on the first information, and wherein the second SPS resource configuration is mapped to the second cell based on the second information.

* * * * *